United States Patent
Barbosa Leite

[19]

[11] Patent Number: 5,897,273
[45] Date of Patent: Apr. 27, 1999

[54] DEBURRING TOOL AND PROCESS ON A HOLE OPPOSITE THE TOOL

[75] Inventor: Adélio Joaquim Barbosa Leite, Saint Mammes, France

[73] Assignee: Societe Nationale d'Etude et de Construction de Moteurs d'Aviation "Snecma", Paris, France

[21] Appl. No.: 08/891,028

[22] Filed: Jul. 10, 1997

[30] Foreign Application Priority Data

Jul. 11, 1996 [FR] France .................................. 96 08657

[51] Int. Cl.⁶ ...................................................... B23B 35/00
[52] U.S. Cl. ........................ 408/1 R; 408/159; 408/188; 408/714
[58] Field of Search .................... 408/158, 159, 408/180, 187, 714, 188

[56] References Cited

U.S. PATENT DOCUMENTS

| 2,404,027 | 7/1946 | Belanger . | |
|---|---|---|---|
| 2,438,558 | 3/1948 | Hollander . | |
| 3,827,821 | 8/1974 | Swenson | 408/59 |
| 4,303,356 | 12/1981 | Williams | 408/187 |
| 4,580,932 | 4/1986 | Depperman | 408/714 |
| 4,589,805 | 5/1986 | Duffner | 408/174 |
| 5,181,810 | 1/1993 | Heule | 408/714 |

FOREIGN PATENT DOCUMENTS

| 983476 | 6/1951 | France . | |
|---|---|---|---|
| 67 687 | 8/1892 | Germany . | |
| 2354496 | 2/1975 | Germany | 408/188 |
| 24878 | of 1895 | United Kingdom | 408/188 |
| WO 94/20249 | 9/1994 | WIPO . | |

*Primary Examiner*—Daniel W. Howell
*Assistant Examiner*—Monica Smith
*Attorney, Agent, or Firm*—Oblon, Spivak, McClelland, Maier & Neustadt, P.C.

[57] ABSTRACT

A deburring machine essentially comprising a cutting tool (13) which pivots on an axis (16) that is perpendicular to the axis of rotation (X) and which may be retracted inside the cover (11) by a wedge (10) so that the cover (11) may be inserted through a hole; the cutting tool (13) may then be extended and opened out to deburr the edge of the hole situated on the hidden face of the part. The cutting tool pivots freely in order to adopt the correct angle for the edge to be deburred.

7 Claims, 2 Drawing Sheets

DEBURRING TOOL AND PROCESS ON A HOLE OPPOSITE THE TOOL

DESCRIPTION

The invention relates to a deburring tool and process, whose main aim is to remove the burrs from the edge of a hole situated on the face opposite the tool in a drilled part.

It may be used in particular for parts with a large surface area or with a cavity, which is to say in general on parts which are laborious to remove in order to present both faces to the deburring machine where the tool is located, or where one face is inaccessible. A manual or an automatic machine may be used, depending on the application.

A problem which arises when a hidden face is to be machined is that it is difficult or even impossible to identify the position and especially the direction of this surface, which consequently means that it is impossible to adjust the position of the tool and its cutting edges precisely. Nevertheless, the purpose of the invention is to propose a tool which overcomes this problem without the need for a complicated structure.

The deburring tool which is provided here has an oval section cutting tool (such as a blade), a cover which supports the cutting tool, rotating on an axis on which the cutting tool pivots, in an axis perpendicular to the axis of rotation of the cover, in order to extend in a direction which is perpendicular or parallel to the axis of rotation, and a wedge which slides in the cover along the axis of rotation until it is engaged alongside the cutting tool, so as to bring it so that its direction of extension is parallel to the axis of rotation, the cutting tool protruding beyond the cover when the direction of extension is perpendicular to the axis of rotation.

The prior art already includes several similar tools (refer to the U.S. Pat. Nos. 2,404,027, 2,438,558 and 3,827,821, DE 67,387, WO 94,20249 and FR 983,476), but the extension and retraction of the cutting tool are controlled by a mechanism actuated by the user, and the direction of the cutting tool is determined by the mechanism. The cutting tool therefore cannot turn or pivot to suit the actual position or shape of the contour to be machined, which exposes it to irregular operation that may cause incorrect machining or damage. Unfortunately, the user cannot adjust the direction of the cutting tool as he cannot see it, even less so when the tool passes through a drilled hole and there is virtually no room to direct it. It must therefore be concluded that the existing tools are unable to guarantee satisfactory machining conditions by presenting the cutting tool suitably to the edge to be deburred. It may be considered that the essential purpose of the invention is to resolve this problem. It is disposed so that the wedge used to bring the cutting tool into the retracted position is clear of the cutting tool during machining: the cutting tool then pivots freely around the axis perpendicular to the axis of rotation of the cover; it is extended by centrifugal force as soon as the cover rotates and angles itself correctly with regard to the edge to be deburred by contact with it.

This deburring tool therefore applies to processes whereby the cover is inserted through a hole, the wedge is then engaged alongside the cutting tool, then the wedge is moved clear and the cover rotates, whilst exerting traction on it to bring the cutting tool into contact with the edge of the hole on the hidden face; when the deburring operation is complete, the cover is inserted again and the wedge is again engaged alongside the cutting tool before withdrawing the cover from the hole and moving onto the next job.

The invention will now be described in greater detail with the aid of the following appended diagrams, by way of illustration but in no way restrictively:

Figure 1:
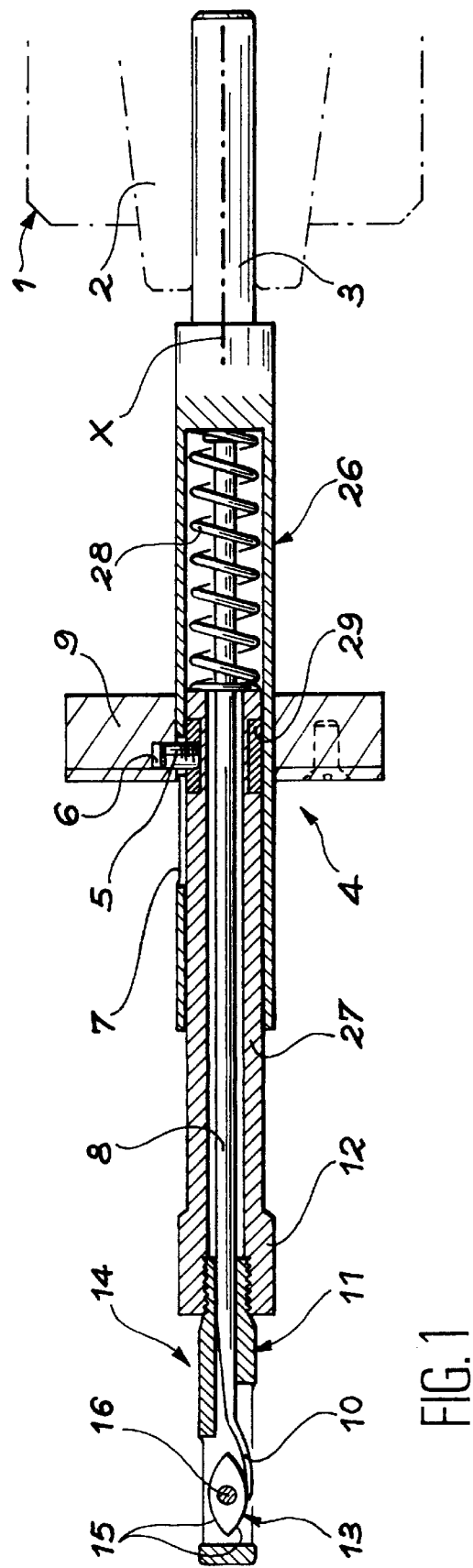
FIG. 1 shows a general view of the deburring tool.

In FIG. 1, there is the sketch of a drilling machine 1, which may be manual or automatic of known type and which in particular has a rotating chuck 2. The chuck 2 grips a spigot 3 at the rear of the deburring tool, which extends forward by means of an adjustment spindle 4.

The adjustment spindle 4 is hollow and contains a rod 8, which runs the entire length of the longitudinal axis X of the deburring tool (which is to say its axis of rotation) and whose rear end is attached to the spigot 3. The front end of the rod 8 ends in a wedge 10, located outside of the drilling spindle 4 and in a cover 11 which extends it. The cover 11 is screwed into a nut 12 attached to the end of the drilling spindle 4, and it holds a cutting tool formed of a blade 13; the assembly formed by the blade 13 and the cover 11 forms a removable cutting head 14 which may be replaced by another to suit the job, particularly as concerns the diameter of the hole to be deburred.

Figure 1A:
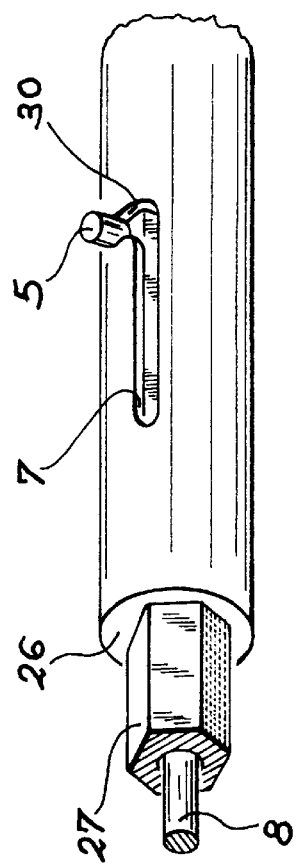
FIG. 1A illustrates a detail of the tool, and the FIGS. 2A to 2D show the various steps of the process.

It can be seen that the adjustment spindle 4 is composed of an external sheath 26 joined to the spigot 3, and a sleeve 27 engaged in the sheath 26 and a spring 28 which encircles the end of the rod 8, compressed between the ends of the external sheath 26 and the sleeve 27, thus tending to separate them. The sleeve 27 holds the nut 12, as well as a knurled knob 9 which encircles the external sheath 26, via a lock stud 5 screwed into a bush 29 of the sleeve 27, the head of which enters into a hole 6 in the knurled knob 9. In addition, the lock stud 5 passes through a groove 7 in the external sheath 26, which may be clearly seen in FIG. 1A.

The blade 13 is of oval section, which is to say slightly longer in one direction than the other, and has cutting edges 15 on its outside faces. Furthermore, it pivots freely on an axis 16 which is perpendicular to the axis X of the cover 11. A weak torsion spring may be added if so desired, to ensure that it is extended when the wedge 10 is withdrawn.

Figure 2A:
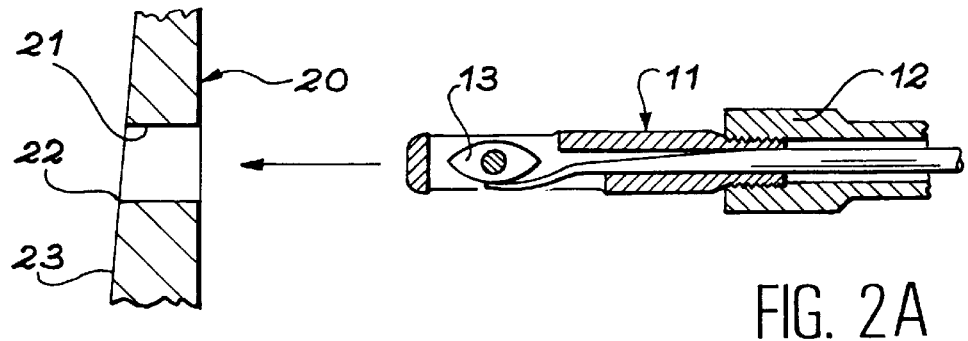
Figure 2B:
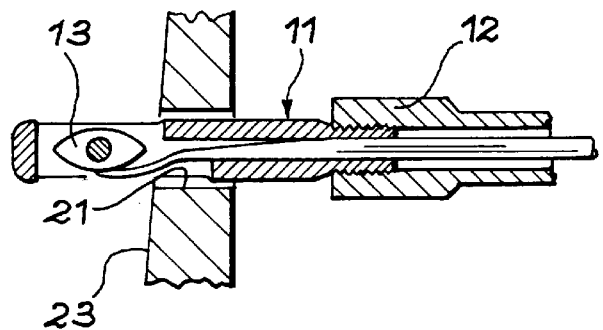
Figure 2C:
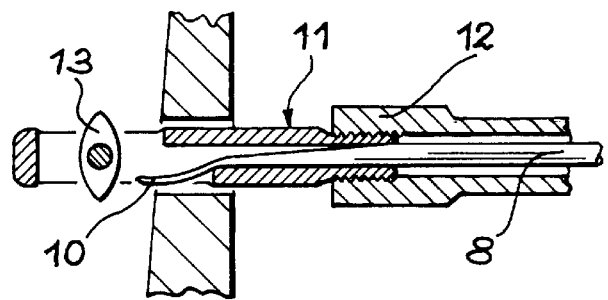
Figure 2D:
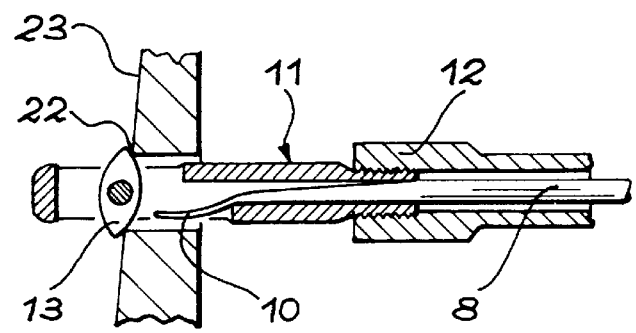

In the situation shown, where the rod 8 is extended, the wedge 10, whose position is a little offset next to the X axis, runs alongside the blade 13 and is engaged against it, which makes the blade 13 extend along the X axis and brings it into the cover 11, which is wider than the narrow section of the blade 13. In this condition, the deburring tool is brought up to the part 20 (FIG. 2A) which has a hole 21 through it, whose edge 22 on the hidden face 23 is to be deburred, which is opposite to the tool and the depth and angle of which are unknown. As shown in FIG. 2B, the cover 11 is first introduced through the hole 21, until its end and more particularly the blade 13 protrude past the hidden face 23; the knurled knob 9 is then turned by the operator, to move the lock stud 5, which has been held in a bend in the groove 7, in front of the main part, axially to it: the spring 28 can then extend and push the sleeve 27 forwards, the rod 8 and the wedge 10 remaining stationary, which frees the blade 13, which adopts a position that is perpendicular to the one it was in prior to the action of the forces of inertia due to the rotation of the chuck 2 and the spindle 4. In FIG. 2C, it may be seen that the direction of its extension then becomes perpendicular to the axis of rotation X, and that the blade 13 is sufficiently long for it to protrude past the cover 11. The drilling machine 1 is then moved backwards until the blade 13 touches the edge 22 to be deburred, where it is held until it completes the work to be performed (FIG. 2D); it then adopts the same angle as that of the hidden face 23.

The tool is extracted by reversing the operations, which consists of moving the drilling machine 1 forward, stopping it from turning and pulling the knurled knob 9 to bring the blade 13 next to the wedge 10 before withdrawing the drilling machine 1 definitively.

It may be observed that the function of the bush 29 is to accompany the movement of the knurled knob 9 by rotating in the sleeve 27 without actually moving it, as it must rotate with the external sheath 26 so as not to turn the blade 13 against the wedge 10, and above all to transmit the rotation of the chuck 2: the external sheath 26 and the sleeve 27 may be of polygonal section.

I claim:

1. A deburring tool comprising:

an oval cutting tool;

a cover which supports said cutting tool, said cover configured for rotation about a first axis, said cutting tool rotatably mounted to said cover for rotation about a second axis which is perpendicular to said first axis, between a retracted position and an extended position, wherein said cutting tool protrudes beyond an outer surface of said cover when in said extended position and wherein said cutting tool is retracted within said cover when said cutting tool is in said retracted position; and a wedge slidable within said cover along said first axis between a first and second position, wherein in said first position, said wedge is engaged with said cutting tool such that said cutting tool is held in said retracted position and wherein in said second position, said wedge is separated from said cutting tool such that said cutting tool is freely rotatable about said second axis.

2. The deburring tool according to claim 1, further comprising:

a cutting spindle which includes said wedge, and which is configured to engage a drilling machine; and a removable head which includes said cover and said cutting tool, said removable head configured to engage with said cutting spindle.

3. The deburring tool according to claim 1, further comprising:

an external sheath configured to be rotated by a drilling machine;

a sleeve engaged with said cover and slidable within said sheath along said first axis, wherein said wedge is attached to a first end of said sheath such that said sleeve and said housing are slidable relative to said wedge; and a positional adjustment part configured to determine the relative position between said sheath and said sleeve.

4. The deburring tool according to claim 3, further comprising a spring provided between said sheath and said sleeve.

5. The deburring tool according to claim 3, wherein said positional adjustment part comprises:

a control knob;

a stud which protrudes through a groove provided in said sheath, said stud having a first end engaged with said control knob, said groove including a bend; and a bush engaged with said sleeve, wherein said stud includes a second end engaged with said bush.

6. A deburring process using a deburring tool which comprises:

providing an oval cutting tool;

providing a cover which supports said cutting tool, said cover configured for rotation about a first axis, said cutting tool rotatably mounted to said cover for rotation about a second axis which is perpendicular to said first axis, between a retracted position and an extended position, wherein said cutting tool protrudes beyond an outer surface of said cover when in said extended position and wherein said cutting tool is retracted within said cover when said cutting tool is in said retracted position; and providing a wedge slidable within said cover along said first axis between a first and second position, wherein in said first position, said wedge is engaged with said cutting tool such that said cutting tool is held in said retracted position and wherein in said second position, said wedge is separated from said cutting tool such that said cutting tool is freely rotatable about said second axis;

inserting said cover through a hole formed in a part which is to be deburred, while said wedge is in said first position;

moving said wedge to said second position;

rotating said cover;

moving said cover such that said cutting tool contacts a face of said part to be deburred while rotating said cover;

moving said cover away from said face so that said tool is spaced from said face;

moving said wedge into said second position; and withdrawing said cover from said hole.

7. The deburring tool according to claim 1, wherein said oval cutting tool is rotatable mounted to said housing such that said oval tool pivot freely about said first axis during rotation of said housing.

* * * * *